United States Patent Office 3,509,060
Patented Apr. 28, 1970

3,509,060
CLEANING AND ANTISTATIC AGENT
George J. Kostas, Houston, Tex., and Orwin G. Maxson and Wayne R. Sorenson, Ponca City, Okla., assignors to Continental Oil Company, Ponca City, Okla., a corporation of Delaware
No Drawing. Original application Dec. 2, 1964, Ser. No. 415,226. Divided and this application July 28, 1966, Ser. No. 568,415
Int. Cl. C09d 9/00
U.S. Cl. 252—170          5 Claims

ABSTRACT OF THE DISCLOSURE

A low molecular weight alcohol containing 5–20% of an ethoxylate of a high molecular weight alcohol are disclosed as cleaning and antistatic compositions. Windows, for example, cleaned with such compositions remain clear for extended periods.

---

This is a division of our copending application filed December 2, 1964, and having Ser. No. 415,226 which was a continuation-in-part of Ser. No. 334,586, filed Dec. 30, 1963, both now abandoned. In the earlier filed application, there is disclosed and claimed a composition comprising a vinyl thermoplastic resin and an effective amount of an internal and/or an external lubricant therefor, said lubricant being selected from the group consisting of aliphatic alcohols of about 10 to about 30 carbon atoms and carboxylic acid esters thereof, the carboxylic group of said esters containing from 1 to about 10 carbon atoms.

We have now found that the alkoxylates of such alcohols are also useful as both internal and external lubricants, and that such alkoxylate when incorporated into the polymerization recipe also imparts desirable polymerization characteristics. We have also found that the alcohols and derivatives thereof are effective in reducing stress cracking in certain vinyl thermoplastic resins such as polyethylene, polypropylene and copolymers of these olefins. We have also found that these lubricants are good antistatic agents.

This invention, therefore, relates to a modified polymeric composition of matter, and more especially vinyl polymer. In one aspect, the invention relates to a plastic composition of improved processability comprising a vinyl polymer and a high molecular weight alcohol or derivative thereof, and to method for preparing such composition. In another aspect, this invention relates to a method of improving the polymerization characteristics of emulsion and dispersion type vinyl polymerization and to improved composition resulting therefrom. In still another aspect, this invention relates to a method of relieving stress cracking of vinyl polymers.

It is recognized in the art that certain thermoplastics which have desirable chemical and/or mechanical properties have failed to achieve commercial acceptance because of the difficulty in fabrication to the end product by conventional techniques, such as injection molding and extrusion. Other plastics, which have achieved such acceptance, have done so in spite of the recognized fabrication problems because of their other desirable properties. Among such plastics are polystyrene and its copolymers and/or blends with other plastics, and high molecular weight olefin polymers and copolymers, such as high molecular weight polyethylene, polypropylene, and other such vinyl polymerized resins. It has been proposed to alleviate this fabrication problem, to the extent possible, by use of various internal lubricants, such as butyl stearate or mineral oil. Internal lubricants should not be confused with plasticizers, since the former are added for the purpose of changing the flow properties of the molten polymer, and preferably have a minimal effect on the physical properties of the finished molded object. Plasticizers, on the other hand, are added for the purpose of changing the properties of the finished product, e.g. its "softness" or flexibility, and the effect on the viscosity of the plastic melt is secondary. External lubricants are sometimes used for the purpose of improving the flow properties of solid polymer pellets into the melting zone of fabrication devices such as injection molders or extrusion devices; these external lubricants are applied to the pellet surface, and their effect on both the plastic melt and the finished object is minimal. Thus, it is seen that internal lubricants are used to achieve specific effects which may differ from those achieved by either external lubricants or plasticizers and all three of these operate in a different manner.

Surface static charges are a great problem in many industries with many products. Many anti-static agents have been used with various degrees of success. We have now found that the alkoxylate lubricants of this invention are good anti-static agents which have good resistance to weathering.

Accordingly, it is an object of this invention to provide an improved internal lubricant for vinyl thermoplastics. It is another object of this invention to provide an improved external lubricant for vinyl thermoplastics. It is another object of the invention to provide improved thermoplastic compositions containing internal lubricants. It is yet another object of this invention to provide method for obtaining improved vinyl thermoplastic compositions containing lubricants. Still another object of this invention is to provide a thermoplastic composition of improved stress cracking characteristics. Yet another object of this invention is to provide a method of imparting anti-static properties to resins, fibers, glass, fiberglass, and the like. Other aspects, objects, and the several advantages of this invention will become apparent upon study of this disclosure and the appended claims.

According to the invention, there is provided a composition comprising a vinyl thermoplastic resin and an effective amount of an internal lubricant therefor, said lubricant being selected from the group consisting of aliphatic alcohols of about 10 to about 30 carbon atoms, carboxylic acid esters thereof and alkoxylates thereof, the carboxyl group of said esters containing from 1 to about 10 carbon atoms, and the alkoxylates being preferably alkoxylated from about 5 to 65 percent. However, lesser degree of alkoxylation is operable as is a higher degree, the upper preferred limit being the degree of alkoxylation readily obtainable. There is further provided a method of producing an internally lubricated vinyl thermoplastic resin which comprises polymerizing monomer of said resin in the presence of an effective amount of an internal lubricant selected from the group consisting of aliphatic alcohols of about 10 to about 30 carbon atoms, carboxylic acid esters thereof, and alkoxylates thereof, the carboxyl group of said ester containing from 1 to about 10 carbon atoms. There is also provided a method of producing an internally lubricated vinyl thermoplastic resin which comprises blending into said resin an effective amount of an internal lubricant selected from the group consisting of aliphatic alcohols of about 10 to about 30 carbon atoms, carboxylic acid esters thereof and alkoxylates thereof, the carboxyl group of said ester containing from 1 to about 10 carbon atoms and the alkoxylation being generally 5 to 65 percent. There is additionally provided, as an article of manufacture, a vinyl thermoplastic pellet having on its surface a lubricant selected from the group consisting of aliphatic alcohols of about 10 to about 30 carbon atoms, carboxylic acid esters thereof and alkalene oxide derivatives thereof, the carboxyl group of said ester containing from 1 to about 10 carbon atoms and the degree of alkoxylation being generally in the range 5 to 65 percent. There is still additionally provided as a glass cleaner and glass wax a composition comprising a gel of an alkoxylate of a high molecular weight aliphatic alcohol in a low molecular weight alcohol, said high molecular weight alcohol containing from about 10 to about 30 carbon atoms, but preferably 18 to 30 carbon atoms, said alkoxylate being generally alkoxylated in the range 5 to 65 percent and said low molecular weight alcohol containing 1 to about 6 carbon atoms. Glass treated with such a gel resists weathering and can readily be cleaned by wiping for prolonged periods.

There is also provided a method of reducing surface static of plastic films, fibers, extrusions, moldings, coatings, foams, papers, glass and the like which comprises coating the surface of such articles with an anti-static agent comprising alkoxylates of aliphatic alcohols of about 10 to about 30 carbon atoms, said alkoxylate being alkoxylated generally in the range 5 to 65 percent. In general, it is preferred to prepare a solution of the alkoxylate in a low molecular weight alcohol for this purpose. There is also provided a method of treating a glass surface by coating same with a gel prepared from a low molecular weight aliphatic alcohol of 1 to about 6 carbon atoms and an alkoxylate derived from a high molecular weight aliphatic alcohol of about 10 to about 30 carbon atoms and said alcohol being alkoxylated generally in the range 5 to 65 percent.

In all of the above applications, the alcohol is preferably selected from the group consisting of aliphatic alcohols of at least 16 carbon atoms, generally 16 to 24, except when used as a promoter, the alcohol is preferably at least 20 carbon atoms.

Vinyl thermoplastics amenable to improvement by this invention include generally those plastics resulting from polymerization of a monomer through the vinyl group, $CH_2=C<$, as are known in the art. Exemplary monomers include the acrylics, such as acrylic acid and its derivatives and esters such as methacrylic acid, methyl acrylate, methyl methacrylate, and acrylonitrile, the vinyl derivatives such as vinyl chloride and vinyl acetate, the olefins such as ethylene and propylene, the styrenes such as styrene itself and alpha-methyl styrene, and vinyl heterocyclic nitrogen containing monomers such as vinyl pyridine and vinyl quinoline and alkyl substituents of such monomers such as methyl vinyl pyridine, methyl ethyl vinyl pyridine and similar quinolines. Copolymers, terpolymers and blends based on these monomers are also within the scope of the invention, as are blends of polymer based on these monomers with a minor amount of a rubbery polymer such as butadiene-styrene copolymer and blends. Examples of typical and operable copolymer and terpolymer include styrene-acrylonitrile copolymer, acrylonitrile-butadiene-styrene terpolymer, ethylene-propylene copolymer, methyl vinyl pyridine-vinyl chloride copolymer and the like. Suitable blends include polystyrene blended with butadiene-styrene copolymer, polyethylene-polypropylene blends and isoprenestyrene blends. The necessity of an external lubricant can be readily determined by noting the tendency of polymer pellets or powder to "bridge" or jam in the feed mechanism of the fabrication device such as injection molders or extruders; generally, the acrylics and styrene-type polymers require use of some external lubricant, while olefin polymers are "slick" enough to generally not require use of an external lubricant for proper feeding in the solid form. On the other hand, high molecular weight olefin polymers, styrene polymer and vinylpyridine polymers exhibit rheological properties which make the use of an internal lubricant desirable and often necessary, as is known in the art.

The lubricants of this invention include generally the aliphatic alcohols, straight- and branched chain of about 10 to about 30 carbon atoms, preferably 16 to 24 carbon atoms, the carboxylic acid esters thereof in which the carboxy group contains from one to about 10 carbon atoms and the alkoxylates thereof wherein the degree of alkoxylation is generally in the range 5 to 65 percent. Examples of the lubricants include n-decanol, 3-methyl dodecanol, octadecanol, eicosanol, docosanol, tetracosanol, tricontanol, decyl formate, triacontyl acetate, eiconsanyl butyrate, docosanyl decanoate, triacontanyl butyrate, decanolethoxylate, dodecanolprothoxylate, eicosanolisoprothoxylate, triacontanolbuthoxylate, and the like. Preferably the $C_{20}+$ alcohols and derivatives are utilized.

The alcohols of this invention include generally the aliphatic alcohols, straight- and branched chain, of about 20 to about 30 carbon atoms, the same carboxylic acid esters and alkoxylates of these $C_{20}+$ alcohols. The "Alfol" or alcohols produced by the so-called growth reaction are particularly applicable in this invention. These alcohols are prepared by reacting metal alkyls, e.g. aluminum tri- and dialkyls with an olefin, particularly ethylene, to produce long chain alkyl groups which product is subsequently oxidized and the alcohol recovered by hydrolysis and the alcohol spray dried. The reactions can be illustrated as follows wherein triethylaluminum is reacted with ethylene.

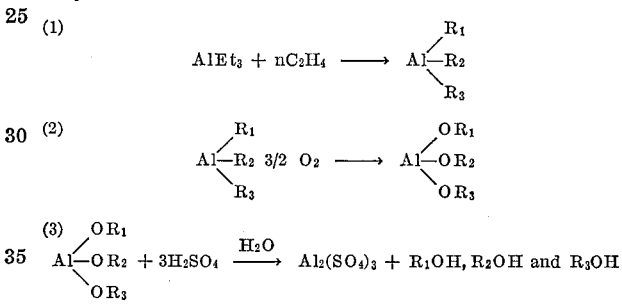

wherein $R_1$, $R_2+R_3$ are alkyl and wherein the sum of carbon atoms in $R_1$, $R_2+R_3$ is equal to $n+6$.

This growth product alcohol is fully described in U.S. Patent 3,053,905 to Donald M. Coyne, Paul A. Lobo and Billy J. Williams and issued Sept. 11, 1962.

The low molecular weight alcohols useful in the gel cleaning composition of this invention are $C_1$ to $C_6$ aliphatic, straight chain or branched chain alcohols. Examples of such alcohols include methanol, ethanol, propanol, isopropanol, butanol, pentanol, hexanol, and isomers thereof.

When used as external lubricants, the compounds of this invention can be applied to the solid resin surface by simply tumbling the pellets to be treated with finely-divided solid or liquid lubricant, by evaporation of solvent from a solution of the lubricant in which the pellets or resin are immersed, or any suitable known manner. When used as internal lubricants or for improving the resistance to stress cracking, they can be blended into the resin in such machines as a Banbury mixer, Welding Engineer twin screw extruder, or Baker-Perkins Ko-Kneader. Suitable blending temperatures are from about 25° to about 500° F. or below the decomposition temperature of the resin and the lubricant. Internal lubricants of this invention are used in an amount between about 0.1–10, preferably 0.5–7, and still more preferably 1–5 weight percent based on the resin. External lubricants are generally used in smaller amounts, such as about 50–2000 p.p.m. based on the resin. Internal lubricants can alternatively be incorporated in the plastic by inclusion during polymerization of the monomer, as in bulk polymerization of styrene. The lubricant can be charged to the reactor in a separate stream, pre-mixed with the monomer, or pre-mixed with the catalyst as desired.

Rheological properties of internally lubricated polymers can be determined by extrusion of polymer melt through a melt rheometer orifice driven by a bench model Instron machine.

Specific examples of systems included within the scope of this invention are: polystyrene plus eiconalethoxylate; methylvinylpyridine-styrene copolymer plus dodecalprothoxylate; polystyrene plus eicosanol and docosanol; rubber-modified polystyrene blend plus eicosanyl butyrate; methylmethacrylate polymer plus triacontanol; vinylidene chloride polymer plus 3-methyl dodecanol; styrene-acrylonitrile copolymer plus decyl formate; ethylene- propylene copolymer plus triacontyl acetate; acrylonitrile-butadiene-styrene terpolymer plus hexacosanol; polyethylene-polypropylene blend plus eicosanyl butyrate and docosanol; polyvinyl chloride plus hexaconalethoxylate and docosanol; vinyl acetate polymer plus pentacosanol.

Among the advantages obtained by the use of this invention are: ability to utilize higher processing temperatures in operations such as compounding, mastication, extrusion, molding and curing, which results from the high decomposition temperatures of these additives and their low volatility; significant power requirement reductions during extrusion and molding as compared to known lubricants, which results from improved flow or rheological properties; and improved finished polymer surface characteristics, which results from the reduced flashing of additive during passage through a molding gate because of the low volatility of the additive.

The alkoxylates are particularly useful in reducing stress cracking. When used for this purpose, it is generally preferred to use from 1 percent up to the percent of compatibility of the alkoxylate with the polymer. The upper limit therefore is dependent upon some degree then in the polymer used. For example, ethoxylates of "Alfol" alcohols of 10 to 20 carbon atoms ethoxylated to 50 percent or more are compatible with polyethylene up to about 5 percent. It will be within the skill of the art to determine the degree of compatibility of other alkoxylates and other polymers.

The cleaning composition of this invention is prepared by mixing sufficient low molecular weight alcohol with the high molecular weight alcohol derivative thereof to produce a gel. The consistency of the gel can vary over a wide range and the ratio of low molecular weight alcohol or solvent alcohol to the $C_{10}$ plus material is dependent upon the desired physical characteristics of the gel. In general a 5 to 20 weight percent higher alcohol in the solvent will be satisfactory.

The anti-static agents of this invention are any of the lubricants described above. These agents can be applied to the surface of the article to be treated, can be incorporated in the plastic polymer prior to molding or forming, or can be incorporated during the polymerization step as previously described. When applied to the surface of the resin, glass or other article, the anti-static agent will generally be dissolved in a volatile solvent such as a low molecular weight alcohol, e.g. 1 to 6 carbon atoms, as previously mentioned, and the article immersed in the solution, and the solvent evaporated either by application of heat or in the air as desired. When such solutions are applied to articles prepared from the thermoplastic resins, glass fibers, papers, etc. these high molecular weight alcohols and derivatives will yield coatings of maximum durability and resistance to washing and weathering. The coatings possess a low coefficient of friction and good electrical conductivity thus solving mechanical handling problems and static dust pick-up. These materials are very effective on expandable polystyrene pellets. The coating is advantageously applied at the polymerization plant as an adjuvant to the standard methyl alcohol wash. The coating will be effective during pre-expansion, will not interfere with steam molding and will continue to impart anti-static properties to the finished product.

The invention will be further illustrated by the following examples.

EXAMPLE I

The polymer used was a polystyrene purchased from Dow Chemical identified as Styron 475B H–27 No. 71. Batches of this material were dry blended with 2 weight percent internal lubricant, treated in a Banbury at 300–325° F. for 7 to 8 minutes, sheeted off on a 2-roll mill, granulated and then tested in an Instron-driven melt rheometer having an 0.062″ diameter x 3″ long orifice jacketed at 200° C., at varying shear rates as shown in Table I, below, and required the tabulated shear stresses:

TABLE I

| | Shear rate/sec. | | | | | | | | | |
|---|---|---|---|---|---|---|---|---|---|---|
| | 2.18 | 5.46 | 10.92 | 21.85 | 54.62 | 109.25 | 218.49 | 546.23 | 1,092.45 | 2,184.94 |
| | Shear stress required, p.s.i. | | | | | | | | | |
| Sample No.: | | | | | | | | | | |
| 1 | 2.1443 | 3.6580 | 5.2347 | 7.1267 | 10.0279 | 13.3074 | 15.5778 | 20.3080 | 24.1551 | 28.0653 |
| 2 | 1.911 | 3.406 | 4.8563 | 6.6622 | 9.2080 | 11.938 | 14.1273 | 18.478 | 22.074 | 25.7318 |
| 3 | 1.816 | 2.964 | 4.4022 | 6.054 | 8.5773 | 11.1505 | 13.2443 | 17.2807 | 20.5602 | 24.3443 |
| 4 | 1.640 | 2.952 | 4.2381 | 5.8905 | 8.338 | 11.8442 | 13.1813 | 17.0284 | 20.371 | 24.1551 |
| 5 | 1.8164 | 3.2165 | 4.667 | 6.2437 | 8.7664 | 10.9739 | 13.6558 | 17.9114 | 21.4432 | 25.3534 |
| 6 | 1.6587 | 3.0272 | 4.4463 | 6.1807 | 7.7034 | 10.9738 | 13.6858 | 17.7852 | 21.1278 | 24.6000 |
| 7 | 1.727 | 3.0777 | 4.4778 | 6.2438 | 8.7665 | 11.1000 | 13.7489 | 17.9114 | 21.6324 | 25.7949 |
| 8 | 2.2893 | 3.9102 | 5.5311 | 7.3979 | 10.2801 | 12.8659 | 16.0193 | 21.017 | 25.2273 | 29.8953 |

NOTE.—Sample additive identification was as follows: No. 1, polymer with no additive; No. 2, mineral oil No. 3, butyl stearate; No. 4, blend of n-$C_{20}O$ and n-$C_{22}$ alcohol; No. 5, liquid portion of acetate ester of additive No. 4; No. 6, liquid butyrate ester of additive No. 4; No. 7, solid portion of acetate ester of additive No. 4; and No. 8, polymer with no additive added and not subjected to Banbury.

These same materials were tested for other physical properties as shown in Table II.

TABLE II

| Sample No. | Tensile ultimate, p.s.i. | Tensile yield, p.s.i. | Percent elongation | Izod impact, ft. lb./in. | ASTM heat distortion at 264 p.s.i., ° C |
|---|---|---|---|---|---|
| 1 | 5,134 | 5,476 | 51.6 | 2.3754 | 83 |
| 2 | 4,660 | 4,780 | 58 | 2.2582 | 80 |
| 3 | 4,162 | 4,256 | 52.6 | 2.5771 | 77 |
| 4 | 4,244 | 4,602 | 52.2 | 2.2256 | 77.6 |
| 5 | 4,336 | 4,284 | 57.6 | 2.5055 | 77.3 |
| 6 | 4,378 | 4,394 | 59.2 | 2.3396 | 78.6 |
| 7 | 4,244 | 4,150 | 54.7 | 2.4599 | 78 |
| 8 | 5,200 | 5,324 | 65.3 | 2.2127 | 83 |

In this example, the lubricants of this invention were compared with the known lubricants; mineral oil and butyl stearate.

EXAMPLE II

The material of sample 8 from Example I was tested by coating a blend of n-eicosanol and n-docosanol onto polystyrene granules. The lubricant was added by dissolving it in butanol and ethanol, tumbling granules in the solution, and drying the granules. The granules, both treated and untreated, were tested for flow by forcing, with an Instron, a plunger having an hemispherical-shaped nose into a tube of granules resting on a compenetration into the treated polymer was consistently at least 5 to 15 times as great as into the untreated control polymer across the entire load range.

EXAMPLE III

Styrene monomer is polymerized in the presence of the additives of sample numbers 3–7 of Example I in five separate polymerization runs. The resulting polymers exhibit physical properties similar to those of the corresponding samples in Tables I and II.

EXAMPLE IV

"Alfol" alcohol $C_{20}+$ and a 40% ethoxylate of "Alfol" alcohol $C_{20}+$ were each dissolved in methyl alcohol to make a 10% by weight of the $C_{20}+$ material in the methanol. These solutions were applied to both general purpose and high impact polystyrene test bars, allowed to dry, and wiped clean before testing. The test specimens were charged by rubbing with wool and equally exposed to light dust. The static charge on uncoated test specimens and on specimens coated with "Alfol" alcohol $C_{20}+$ were very evident while the specimens coated with "Alfol" alcohol ethoxylates were not charged. The test bars were wiped clean, recharged, and retested repeatedly with the same results indicating a durable coating.

EXAMPLE V

The test bars from Example IV were exposed to Welch Scientific Company electroscope. The distance to the bar from the electroscope probe was measured when leaf separation occurred in the electroscope. All of the polystyrene test bars could be charged by rubbing with wool; however, the test bars coated with "Alfol" alcohol ethoxylates could not be charged to the same extent as uncoated bars or bars with other coatings such as mineral oil or the "Alfol" alcohol $C_{20}+$ alone. The charge would "leak off" or dissipate from the ethoxylate coated specimens at an exceedingly fast rate compared to the other test specimens. The tests were repeated with the same specimens and same results indicating the durability of the coating. Washing the test bars with water did not significantly alter the results.

EXAMPLE VI

When fibers, both natural and synthetic, were coated with the ethoxylates of $C_{20+}$ alcohols, the fibers were rendered smoother or were slippery and became relatively free of static electricity when subjected to friction that would, when applied to untreated fibers, generate static electricity on the surface of the fibers. It is noteworthy that these $C_{20+}$ alcohol alkoxylates impart both lubricating and anti-static properties to the fibers, a property not generally found in the prior art.

EXAMPLE VII

The alkoxylates of alcohol $C_{20+}$ can be dissolved in a low molecular weight alcohol in 1 to 20 parts by weight, preferably 5 to 15 parts, per 100 parts of the lower alcohol to form a solution or gel. This material is an excellent glass cleaner, leaving a long lasting slick invisible destaticizing film on the glass.

EXAMPLE VIII

An ethoxylate of "Alfol" alcohol $C_{20+}$ was prepared as a 10 percent gel in methyl alcohol. The gel was stable at room temperature and had little weight loss due to volatility of the methyl alcohol. Several window panes were cleaned with this gel and several with a general purpose detergent. The alkoxylate treated panes resisted becoming dirty more so than the untreated panes. After four months, the treated panes could be readily wiped clean with tissue.

EXAMPLE IX

Similar results of Example VIII were obtained with water emulsions of the ethoxylate of the $C_{20+}$ alcohol.

EXAMPLE X

The polystyrene of this example was manufactured by Dow Chemical Company and identified as Styron 683 and Styron 492, the latter being a high impact type polystyrene. The $C_{20+}$ "Alfol" alcohol was obtained with Continental Oil's "Alfol" alcohol plant at Lake Charles, La. The ethoxylates and propoxylates of the alcohols were prepared in the laboratory.

"Alfol" alcohol $C_{20+}$ ethoxylate ($C_{2022}EO$) was compounded in a Banbury mixer with both general purpose and the high impact polystyrene at an additive level of 2% by weight. Granulation of the compounded materials normally generates much static with small dusty particles sticking to all surfaces. The polymers containing ethoxylates were much less charged than polymers containing other internal additives such as mineral oil and butyl stearate. Furthermore, the intensity of the anti-static properties imparted to the resin was a direct function to the amount of ethoxylate added and the degree of ethoxylation of the alcohol.

The polymers were injection molded into test specimens. The test bars were exposed to a dusty atmosphere where the bars not containing the ethoxylate developed typical static dust patterns in contrast to the bars containing the ethoxylate. The bars containing the $C_{20+}$ alcohol ethoxylate also showed improved mold release properties and better surface finish of the specimen.

The molded bars were rubbed with wool to generate a static charge and exposed in a uniform manner to light dust. The charged bars not containing the ethoxylate were coated with dust wherein the ethoxylate containing bars were relatively free of such dust.

Tensile strengths were run on the test specimens and the data obtained are shown in Table III. It can be seen that the $C_{20+}$ alcohol alkoxylate containing polymer had higher strength than did the same polystyrene containing a conventional internal lubricant.

TABLE III

| Sample | Tensile yield, p.s.i. | Tensile ultimate, p.s.i. | Elongation, percent |
| --- | --- | --- | --- |
| Styron 492 unmodified | 5,780 | 5,780 | 33 |
| Styron 492 plus 2% butyl stearate | 4,000 | 4,440 | 56 |
| Styron 492 plus 2% $C_{2022}EO$ (40%) | 4,600 | 4,800 | 66 |
| Styron 492 plus 2% $C_{2022}$ | 4,600 | 4,400 | 47 |

EXAMPLE XI

A run was made to show that the use of the "Alfol" alcohol product can be used to improve processibility without loss in tensile strength or elongation and with improvement in stress cracking resistance.

A high pressure polyethylene (Dow Chemical Co. PE 510E) was mixed with 5% by weight in separate runs of each an "Alfol"$_{2022}$ alcohol and a 65% ethoxylate of such an alcohol by mechanically mixing the polyethylene and additive in molten state in a Banbury mixer. The mixes or blends were granulated and compression molded into test specimens. The specimens were evaluated by ASTM test D1693–60T with the following results:

TABLE IV

| Sample | Failure time in minutes | | | |
| --- | --- | --- | --- | --- |
| | Test 1 | Test 2 | Test 3 | Test 4 |
| (1) PE 510E (2 Melt Index) | 39 | 35 | 30 | 30 |
| (2) PE 510E plus 5% "Alfol"$_{2022}$ | 40 | 68 | | |
| (3) PE 510E plus 5% "Alfol"$_{2022}$-65% ethoxylate | 83 | 84 | 50 | 50 |

Other properties and processibility were determined as follows.

TABLE V

| Sample | Tensile, p.s.i. | Elongation, percent | Rheology, lbs. force at 10°/min. |
| --- | --- | --- | --- |
| (1) PE 510E | 2,600 | 155 | 470.6 |
| (2) PE 510E plus "Alfol"$_{2022}$ | 2,490 | 192 | 385 |
| (3) PE 510E plus "Alfol"$_{2022}$-65% ethoxylate | 2,560 | 148 | 427.4 |

A commercial polyethylene puchased from Dow Chemical Company and identified as PE–510E was compounded with both "Alfol" alcohol ethoxylate as well as well as a commercial ethoxylate obtained from Union Carbide and identified as BC–15SL. This commercial ethoxylate was a 66 percent ethoxylated $C_{13}$ alcohol. The polyethylene was compounded with the additive in a laboratory Banbury mixer. The compounded polymer was compression molded into 0.1″ thick sheets from which five test strips were die cut. The ½ x 1½ x 0.1″ test strips were notched, bent in U shape, inserted into a jig which was immersed in a strong detergent in individual test tubes. The tubes containing 5 strips in each were suspended in a circulating temperature controlled bath until 3 of the 5 strips failed by vertical cracks. This test, originated by Bell Laboratories, is accepted as ASTM method D-1693-60T. The data are given in Table VI.

TABLE VI.—ASTM-D-1693-60-T POLYETHYLENE STRESS CRACKING TEST

| Additive [1] | Percent | Time in hours | | |
|---|---|---|---|---|
| | | First failure | Second failure | Third failure |
| 510E Virgin PE | | 2:05 | 2:11 | 2:36 |
| Compounded blank | | 2:05 | 2:07 | 2:09 |
| 1012-6 | 1 | 2:09 | 2:46 | 2:47 |
| 1012-6 | 2 | 3:01 | 3:03 | 4:23 |
| 1012-6 | 5 | 3:25 | 3:40 | 4:58 |
| 1218-6 | 1 | 2:02 | 2:06 | 2:16 |
| 1218-6 | 2 | 2:02 | 2:39 | 2:43 |
| 1218-6 | 5 | 4:23 | 4:47 | 5:12 |
| 1218-4 | 1 | 2:18 | 2:52 | 3:13 |
| 1218-4 | 2 | 2:40 | 3:02 | 3:40 |
| 1218-4 | 5 | 5:25 | 5:55 | 6:25 |
| 1812-6 | 1 | 2:12 | 2:13 | 2:22 |
| 1812-6 | 2 | 2:20 | 3:03 | 3:09 |
| 1812-6 | 5 | 6:17 | 6:59 | 7:12 |
| 2022-6 | 1 | 2:05 | 2:35 | 2:41 |
| 2022-6 | 2 | 3:57 | 4:09 | 4:54 |
| 2022-6 | 5 | 7:30 | 8-11 | 11-24 |
| BC15SL | 1 | 2:06 | 2:26 | 2:33 |
| BC15SL | 2 | 3:52 | 3:59 | 4:14 |
| BC15SL | 5 | 4:26 | 4:43 | 5:11 |

[1] Numbers represent alcohol-percent ethylene oxide. E.g., 1012-6 is an ethoxylate of "Alfol" 1012 containing ca. 60% EO.

While particular embodiments of the invention have been described, it will be understood, of course that the invention is not limited thereto since many modifications can be made, and it is therefore contemplated to cover by the appended claims any such modifications as fall within the true spirit of the invention.

What is claimed is:

1. A cleaning and antistatic composition consisting essentially of 95 to 80 weight parts of a low molecular weight aliphatic alcohol having 1 to 6 carbon atoms as a carrier fluid and 5 to 20 weight parts of a dispersant consisting of ethylene oxide derivatives of aliphatic alcohols of about 10 to 30 carbon atoms; said ethylene oxide derivatives of said alcohols wherein the degree of ethoxylation is in the range of 5 to 65 percent.

2. The composition of claim 1 wherein the carrier fluid is methanol.

3. A method of cleaning the surface of a solid which comprises applying the composition of claim 1 to the surface of said solid and wiping the solid to remove excess composition and dirt.

4. The method of claim 3 wherein said solid is glass.

5. The method of claim 3 wherein said solid is a thermoplastic resin.

References Cited

UNITED STATES PATENTS

| 3,193,507 | 7/1965 | Jacobs | 252—170 |
| 3,245,912 | 4/1966 | White | 252—170 |
| 2,344,671 | 3/1944 | Bertsch | 252—73 |
| 2,867,585 | 1/1959 | Vitale. | |

FOREIGN PATENTS 611,196   12/1960   Canada.

OTHER REFERENCES

Kark-Othmer: Encyclopedia of Chem. Techn., vol. I (1963), pp. 542, 543, 554–557 and 567–69.

LEON D. ROSDOL, Primary Examiner

W. E. SCHULZ, Assistant Examiner

U.S. Cl. X.R.

106—3, 311; 117—55; 134—40; 252—364